United States Patent
Foutch et al.

(10) Patent No.: US 10,612,867 B2
(45) Date of Patent: Apr. 7, 2020

(54) THERMAL MANAGEMENT SYSTEMS INCORPORATING SHAPE MEMORY ALLOY ACTUATORS AND RELATED METHODS

(71) Applicant: The Boeing Company, Chicago, IL (US)

(72) Inventors: David W. Foutch, Seattle, WA (US); Frederick Theodore Calkins, Renton, WA (US)

(73) Assignee: The Boeing Company, Chicago, IL (US)

( * ) Notice: Subject to any disclaimer, the term of this patent is extended or adjusted under 35 U.S.C. 154(b) by 213 days.

(21) Appl. No.: 15/901,779

(22) Filed: Feb. 21, 2018

(65) Prior Publication Data

US 2019/0257599 A1 Aug. 22, 2019

(51) Int. Cl.
*G05D 23/02* (2006.01)
*G05D 23/27* (2006.01)
(Continued)

(52) U.S. Cl.
CPC .............. *F28F 27/00* (2013.01); *F28F 13/00* (2013.01); *G05D 23/024* (2013.01);
(Continued)

(58) Field of Classification Search
None
See application file for complete search history.

(56) References Cited

U.S. PATENT DOCUMENTS

| 1,768,222 A | 6/1930 | Uhde |
| 3,205,939 A | 9/1965 | Huet |

(Continued)

FOREIGN PATENT DOCUMENTS

| CA | 2910896 | 7/2016 |
| EP | 1130257 | 9/2001 |

(Continued)

OTHER PUBLICATIONS

Operation, Installation & Maintenance Manual for W.E. Anderson Series 38R Self-Operating Temperature Regulators, Bulletin V-10, Dwyer Instruments Inc., undated.

(Continued)

*Primary Examiner* — Henry T Crenshaw
*Assistant Examiner* — Daniel C Comings
(74) *Attorney, Agent, or Firm* — DASCENZO Intellectual Property Law, P.C.

(57) ABSTRACT

Thermal management systems incorporating shape memory alloy (SMA) actuators and related methods. A thermal management system includes a heat transfer region, a process fluid conduit, a thermal management fluid conduit, and an SMA actuator assembly. The SMA actuator assembly includes an SMA element coupled to an actuation element, which is configured to assume a position among a plurality of positions defined between a restrictive position and an open position. The position of the actuation element is based, at least in part, on a conformation of the SMA element. A method of passively regulating a temperature of a process fluid includes conveying a process fluid stream in heat exchange relation with an SMA element, transitioning the SMA element to assume a conformation, flowing each of the process fluid stream and a thermal management fluid stream through a heat transfer region, and modulating a flow rate of the thermal management fluid stream.

25 Claims, 7 Drawing Sheets

(51) Int. Cl.
- *F28F 27/00* (2006.01)
- *F28F 13/00* (2006.01)
- *G05D 23/185* (2006.01)
- *G05D 23/275* (2006.01)

(52) U.S. Cl.
CPC ....... *G05D 23/026* (2013.01); *G05D 23/1854* (2013.01); *G05D 23/2754* (2013.01); *G05D 23/025* (2013.01); *G05D 23/185* (2013.01); *G05D 23/1852* (2013.01); *G05D 23/27535* (2013.01)

(56) References Cited

U.S. PATENT DOCUMENTS

| | | |
|---|---|---|
| 3,229,762 A | 1/1966 | Vollhardt |
| 4,060,127 A | 11/1977 | Savin et al. |
| 4,151,710 A | 5/1979 | Griffin et al. |
| 4,203,392 A | 5/1980 | McLane |
| 4,700,541 A | 10/1987 | Gabriel et al. |
| 5,127,228 A | 7/1992 | Swenson |
| 5,150,864 A | 9/1992 | Roglin et al. |
| 5,544,703 A | 8/1996 | Joel et al. |
| 5,975,468 A | 11/1999 | Moignier et al. |
| 6,065,934 A | 5/2000 | Jacot et al. |
| 6,499,952 B1 | 12/2002 | Jacot et al. |
| 7,037,076 B2 | 5/2006 | Jacot et al. |
| 7,723,896 B2 | 5/2010 | Esashi et al. |
| 7,788,921 B2 | 9/2010 | Takahashi |
| 7,878,459 B2 | 2/2011 | Mabe et al. |
| 8,104,278 B2 | 1/2012 | Browne et al. |
| 8,118,264 B2 | 2/2012 | Mabe et al. |
| 8,840,034 B2 * | 9/2014 | Eckberg ............. F28D 15/00 236/101 A |
| 8,876,046 B2 | 11/2014 | Gunter et al. |
| 9,046,082 B2 | 6/2015 | Jee |
| 9,581,146 B2 | 2/2017 | Shome et al. |
| 9,759,203 B2 | 9/2017 | Brown |
| 9,989,040 B2 | 6/2018 | Hallila et al. |
| 2002/0185932 A1 | 12/2002 | Gummin et al. |
| 2003/0215804 A1 | 11/2003 | DeBeer et al. |
| 2004/0261411 A1 | 12/2004 | MacGregor |
| 2005/0210874 A1 | 9/2005 | Browne et al. |
| 2007/0119165 A1 | 5/2007 | Yson et al. |
| 2008/0099193 A1 * | 5/2008 | Aksamit ............. G05D 23/08 165/300 |
| 2009/0143730 A1 | 6/2009 | De Polo et al. |
| 2009/0167108 A1 | 7/2009 | Yang |
| 2010/0102093 A1 | 4/2010 | Ham et al. |
| 2010/0221124 A1 | 9/2010 | Ikushima et al. |
| 2011/0121582 A1 | 5/2011 | Alexander et al. |
| 2012/0060491 A1 | 3/2012 | Gunter et al. |
| 2012/0161579 A1 | 6/2012 | Browne et al. |
| 2012/0292155 A1 | 11/2012 | Gunter et al. |
| 2013/0020061 A1 | 1/2013 | Bergh |
| 2013/0046285 A1 | 2/2013 | Griffin et al. |
| 2014/0086772 A1 | 3/2014 | Olsen |
| 2014/0331665 A1 | 11/2014 | Shivashankara et al. |
| 2015/0096293 A1 | 4/2015 | Shome et al. |
| 2017/0248372 A1 | 8/2017 | Erno et al. |
| 2017/0276440 A1 | 9/2017 | Kenworthy et al. |

FOREIGN PATENT DOCUMENTS

| | | |
|---|---|---|
| EP | 2484586 | 8/2012 |
| EP | 2860401 | 4/2015 |
| FR | 2862353 | 5/2005 |
| JP | 06249129 | 9/1994 |
| WO | WO 01/16484 | 3/2001 |
| WO | WO 2015/042398 | 3/2015 |

OTHER PUBLICATIONS

Technical Information for Temperature Regulators, Part 2: Self-operated Regulators, Samson AG 99/12, 1999.
Machine-generated English translation of the abstract of FR 2862353.
Machine-generated English translation of the abstract of JP 06249129.
European Patent Office, European Search Report for related European Application No. 18213512, dated Jun. 14, 2019.

* cited by examiner

THERMAL MANAGEMENT SYSTEMS INCORPORATING SHAPE MEMORY ALLOY ACTUATORS AND RELATED METHODS

FIELD

The present disclosure relates to thermal management systems incorporating shape memory alloy actuators and related methods.

BACKGROUND

Thermal management systems generally may be configured to regulate the temperature of a process fluid, such as an engine oil, via thermal exchange between the process fluid and a thermal management fluid, such as air. For example, a thermal management system may utilize a stream of cool air to decrease a temperature of a hot oil flowing through a conduit. In some applications, it may be beneficial to modulate a rate at which the process fluid is cooled, such as to increase an efficiency of an engine that utilizes the process fluid. For example, a valve such as a butterfly valve may be selectively actuated to modulate a flow rate of the thermal management fluid that is in thermal contact with the process fluid. However, such valves may be heavy, bulky, and/or expensive, and may require additional components and/or maintenance to ensure reliable operation.

SUMMARY

Thermal management systems incorporating shape memory alloy actuators and related methods are disclosed herein. A thermal management system is configured to regulate a temperature of a process fluid via thermal exchange between the process fluid and a thermal management fluid. The thermal management system includes a heat transfer region within which the thermal exchange between the process fluid and the thermal management fluid occurs. The thermal management system further includes a process fluid conduit configured to convey a process fluid stream of the process fluid in heat exchange relation with the heat transfer region and a thermal management fluid conduit configured to convey a thermal management fluid stream of the thermal management fluid in heat exchange relation with the heat transfer region. The thermal management system additionally includes a shape memory alloy (SMA) actuator assembly configured to selectively regulate a flow rate of the thermal management fluid stream. The SMA actuator assembly includes an SMA element in thermal contact with the process fluid stream and configured to assume a conformation among a plurality of conformations. The conformation of the SMA element is based, at least in part, on a temperature of the process fluid stream. The SMA actuator assembly further includes an actuation element coupled to the SMA element. The actuation element is configured to assume a position among a plurality of positions defined between a restrictive position and an open position. In the restrictive position, the actuation element restricts flow of the thermal management fluid stream within the thermal management fluid conduit. In the open position, the actuation element permits flow of the thermal management fluid stream within the thermal management fluid conduit. The position of the actuation element is based, at least in part, on the conformation of the SMA element.

A method of passively regulating a temperature of a process fluid via thermal exchange between the process fluid and a thermal management fluid includes conveying a process fluid stream of the process fluid in heat exchange relation with a shape memory alloy (SMA) element. The method further includes transitioning the SMA element to assume a conformation among a plurality of conformation, such that the transitioning is based upon a temperature of the process fluid stream. The method further includes flowing the process fluid stream through a heat transfer region and flowing a thermal management fluid stream of the thermal management fluid through the heat transfer region. The method additionally includes modulating a flow rate of the thermal management fluid stream through the heat transfer region to regulate the temperature of the process fluid stream. The modulating is responsive to the transitioning.

DESCRIPTION

Figure 1:
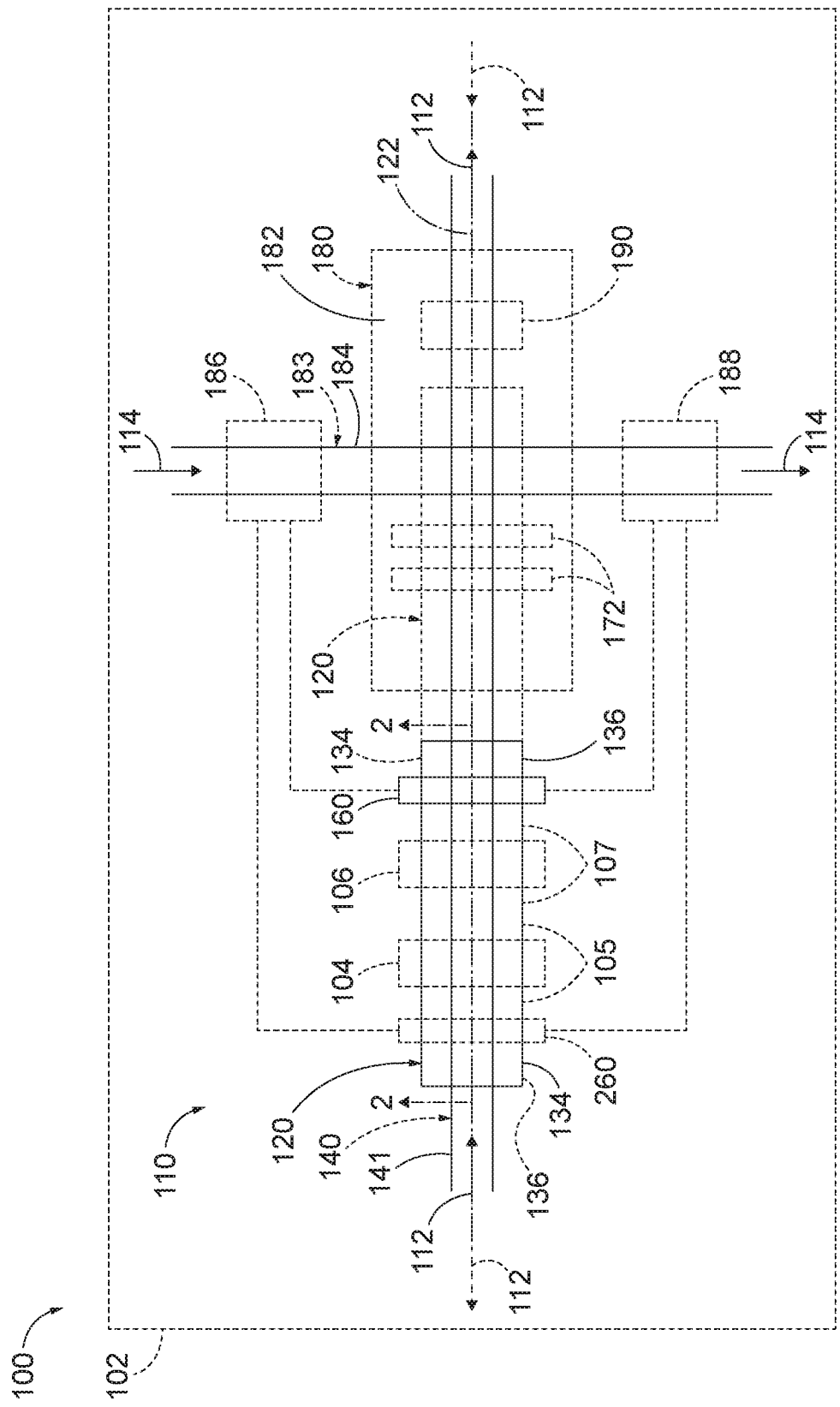
FIG. 1 is a schematic plan view representing thermal management systems according to the present disclosure.

FIGS. 1-9 provide illustrative, non-exclusive examples of shape memory alloy (SMA) actuators 110, of thermal management systems 100 including SMA actuator assemblies 110, of properties of SMA actuator assemblies 110, and/or of methods 300 of passively regulating a temperature of a process fluid, according to the present disclosure. Elements that serve a similar, or at least substantially similar, purpose are labeled with like numbers in each of FIGS. 1-9, and these elements may not be discussed in detail herein with reference to each of FIGS. 1-9. Similarly, all elements may not be labeled in each of FIGS. 1-9, but reference numerals associated therewith may be utilized herein for consistency. Elements, components, and/or features that are discussed herein with reference to one or more of FIGS. 1-9 may be included in and/or utilized with any of FIGS. 1-9 without departing from the scope of the present disclosure. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

FIG. 1 is a schematic illustration of thermal management systems 100 according to the present disclosure. Thermal management system 100 generally is configured to regulate a temperature of a process fluid via thermal exchange between the process fluid and a thermal management fluid. As schematically illustrated in FIG. 1, thermal management system 100 includes a heat transfer region 182 within which the thermal exchange between the process fluid and the thermal management fluid occurs. As examples, thermal management system 100 may be configured such that the thermal exchange between the process fluid and the thermal management fluid increases a temperature of the process fluid and/or decreases a temperature of the process fluid. Thermal management system 100 further includes a process fluid conduit 141 and a thermal management fluid conduit 184. Process fluid conduit 141 is configured to convey a process fluid flow 112 of the process fluid in heat exchange relation with heat transfer region 182. Similarly, thermal management fluid conduit 184 is configured to convey a thermal management fluid flow 114 in heat exchange relation with heat transfer region 182.

The process fluid may include and/or be any appropriate fluid, such as a liquid, water, a lubricant, and/or an oil. Similarly, the thermal management fluid may include and/or be any appropriate fluid for carrying heat energy away from the process fluid and/or supplying heat energy to the process fluid. As examples, the thermal management fluid may include and/or be a gas, air, ambient air that surrounds thermal management system 100, a liquid, water, and/or an organic compound. As a more specific example, the process fluid may be an engine oil that is utilized in a turbofan engine, and the thermal management fluid may be air. In such an embodiment, thermal management system 100 may facilitate more efficient operation of the turbofan engine relative to an otherwise identical turbofan engine that lacks thermal management system 100. For example, in an air-cooled turbofan engine, utilizing an air stream as a thermal management fluid may reduce an efficiency of the engine, such as by redirecting an air stream that otherwise may produce thrust and/or by increasing a drag force on the turbofan engine. Utilizing thermal management system 100 according to the present disclosure in combination with such an engine may decrease an amount of thermal management fluid needed to cool the process fluid, thereby increasing an efficiency of the engine, relative to an otherwise identical engine that lacks thermal management system 100.

With continued reference to FIG. 1, thermal management system 100 additionally includes an SMA actuator assembly 110 configured to selectively regulate a flow rate of the thermal management fluid that is conveyed in heat exchange relation with heat transfer region 182. SMA actuator assembly 110 includes an SMA element 120 that is in thermal contact with the process fluid. SMA element 120 is configured to assume a conformation among a plurality of conformations defined between a first conformation and a second conformation. For example, SMA element 120 may be configured to twist about a central axis 122 to transition among the plurality of conformations. As used herein, the conformation of SMA element 120 may refer to a rotational and/or twisting state of SMA element 120, and/or may refer to any other appropriate shape and/or geometrical property of SMA element 120. The conformation of SMA element 120 is based, at least in part, on a temperature of the process fluid that is in thermal contact with SMA element 120. For example, SMA element 120 may include and/or be an SMA torque tube, and/or may at least substantially formed of a shape memory alloy. As examples, the shape memory alloy may include and/or be a binary alloy; a nickel-titanium alloy; a binary nickel-titanium alloy; a ternary alloy; a ternary alloy that includes nickel and titanium; a ternary nickel-titanium-palladium alloy; a ternary manganese-nickel-cobalt alloy; a quaternary alloy; a quaternary alloy that includes nickel and titanium; and an alloy that includes at least one of nickel, titanium, palladium, manganese, hafnium, copper, iron, silver, cobalt, chromium, and/or vanadium. In an embodiment in which SMA element 120 includes an SMA torque tube, the SMA torque tube may be tubular, cylindrical, and/or hollow.

As further schematically illustrated in FIG. 1, SMA actuator assembly 110 additionally includes an actuation element 160 coupled to SMA element 120. Actuation element 160 is configured to assume a position among a plurality of positions defined between a restrictive position and an open position. When actuation element 160 is in the restrictive position, actuation element 160 restricts flow of the thermal management fluid within thermal management fluid conduit 184. Alternately, when actuation element 160 is in the open position, actuation element 160 permits flow of the thermal management fluid within thermal management fluid conduit 184.

Thermal management system 100 is configured such that the position of actuation element 160 is based, at least in part, on the conformation of SMA element 120. Thus, because the conformation of SMA element 120 may vary with the temperature of the process fluid that is in thermal contact with SMA element 120, and because thermal management fluid flow 114 through heat transfer region 182 is at least partially determined by the position of actuation element 160, thermal management system 100 may passively regulate the temperature of the process fluid. Stated differently, thermal management system 100 is configured such that a rate of heat exchange between the process fluid and the thermal management fluid is based, at least in part, on the temperature of the process fluid. Hence, thermal management system 100 also may be referred to as a passive thermal management system 100 or a feedback regulated thermal management system 100.

Thermal management system 100 generally is configured to bring the thermal management fluid into thermal contact with the process fluid within heat transfer region 182 to change the temperature of the process fluid. As schematically illustrated in FIG. 1, thermal management system 100 may include a heat exchanger 180 that defines heat transfer region 182. As further schematically illustrated in FIG. 1, thermal management system 100 also may include a thermal management fluid tubular 183 that at least partially defines thermal management fluid conduit 184. Stated differently, thermal management system 100 may be configured such that thermal management fluid flow 114 flows through thermal management fluid conduit 184 of thermal management fluid tubular 183 and into heat transfer region 182 of heat exchanger 180. Thermal management fluid tubular 183 may have any appropriate cross-sectional shape. As examples, thermal management fluid tubular 183 may have a cross-sectional shape that is circular, triangular, rectangular, and/or elliptical. Additionally or alternatively, thermal management fluid tubular 183 may include and/or define at least one heat transfer enhancing element, such as a straight fin, a wavy fin, a pair of offset fins, a pin, and/or a dimple.

Thermal management system 100 may be configured to change the temperature of the process fluid at any appropriate location along a path of process fluid flow 112. For example, thermal management system 100 may be configured to change the temperature of the process fluid subsequent to the process fluid flowing through SMA element 120, such as in an embodiment in which SMA element 120 does not extend within heat transfer region 182. Additionally or alternatively, thermal management system 100 may be configured to change the temperature of the process fluid while the process fluid flows through SMA element 120. For example, and as illustrated in dashed lines in FIG. 1, SMA element 120 may be positioned at least partially within heat transfer region 182. In such an embodiment, SMA element 120 may fluidly isolate process fluid flow 112 from thermal management fluid flow 114 during the thermal exchange between process fluid flow 112 and thermal management fluid flow 114. It is also within the scope of the present disclosure that thermal management system 100 may be configured to change the temperature of the process fluid prior to the process fluid flowing through SMA element 120. For example, and as illustrated in dashed lines in FIG. 1, process fluid flow 112 may be directed such that the process fluid flows through heat transfer region 182 prior to flowing through at least a portion of SMA element 120. Such a configuration may facilitate a more precise control of the temperature of the process fluid relative to an otherwise identical thermal management system 100 in which the process fluid flows through SMA element 120 prior to flowing through heat transfer region 182.

As further schematically illustrated in FIG. 1, SMA actuator assembly 110 additionally may include at least one heat spreader 172 in thermal communication with SMA element 120 such that heat spreader 172 is configured to enhance a thermal communication between the thermal management fluid and SMA element 120. For example, in an embodiment in which SMA element 120 extends at least partially within heat transfer region 182, heat spreader 172 may be coupled to SMA element 120 and positioned within heat transfer region 182 such that thermal management fluid flow 114 is in thermal contact with process fluid flow 112 at least partially via heat spreader 172. Stated differently, heat spreader 172 may be configured to facilitate a heat transfer between thermal management fluid flow 114 and process fluid flow 112 while the process fluid flows through SMA element 120. Such a configuration may enable thermal management system 100 to be smaller and/or more efficient relative to an otherwise identical thermal management system 100 that lacks heat spreader 172. As more specific examples, heat spreader 172 may include and/or be a heat sink, a fin, a circular fin, and/or a plate. Heat spreader 172 may be coupled to SMA element 120 in any appropriate manner. For example, heat spreader 172 may be coupled to SMA element 120 such that heat spreader 172 permits SMA element 120 to twist about central axis 122. Additionally or alternatively, SMA actuator assembly 110 may include a plurality of spaced-apart heat spreaders 172 positioned along a length of SMA element 120.

Thermal management system 100 generally may be configured such that SMA actuator assembly 110 varies thermal management fluid flow 114 through heat transfer region 182. For example, and as schematically illustrated in FIG. 1, SMA actuator assembly 110 may define a thermal management fluid inlet valve 186 configured to selectively permit thermal management fluid flow 114 to enter heat transfer region 182 and/or a thermal management fluid outlet valve 188 configured to selectively permit thermal management fluid flow 114 to exit heat transfer region 182. In such an embodiment, actuation element 160 may be configured to selectively actuate thermal management fluid inlet valve 186 and/or thermal management fluid outlet valve 188. More specifically, actuation element 160 may be configured to actuate thermal management fluid inlet valve 186 and/or thermal management fluid outlet valve 188 between a fully closed configuration and a fully open configuration. For example, the fully closed configuration of thermal management fluid inlet valve 186 and/or thermal management fluid outlet valve 188 may correspond to the restrictive position of actuation element 160, and/or the fully open configuration of thermal management fluid inlet valve 186 and/or thermal management fluid outlet valve 188 may correspond to the open position of actuation element 160. Actuation element 160 further may be configured to actuate thermal management fluid inlet valve 186 and/or thermal management fluid outlet valve 188 to at least one partially open configuration, to a plurality of partially open configurations, and/or to an infinite number of partially open configurations that are between the fully closed configuration and the fully open configuration. Actuation element 160 may include and/or be any appropriate mechanism for actuating thermal management fluid inlet valve 186 and/or thermal management fluid outlet valve 188, examples of which include a gear, a spur gear, a worm gear, a lever, and/or a cam.

Figure 2:
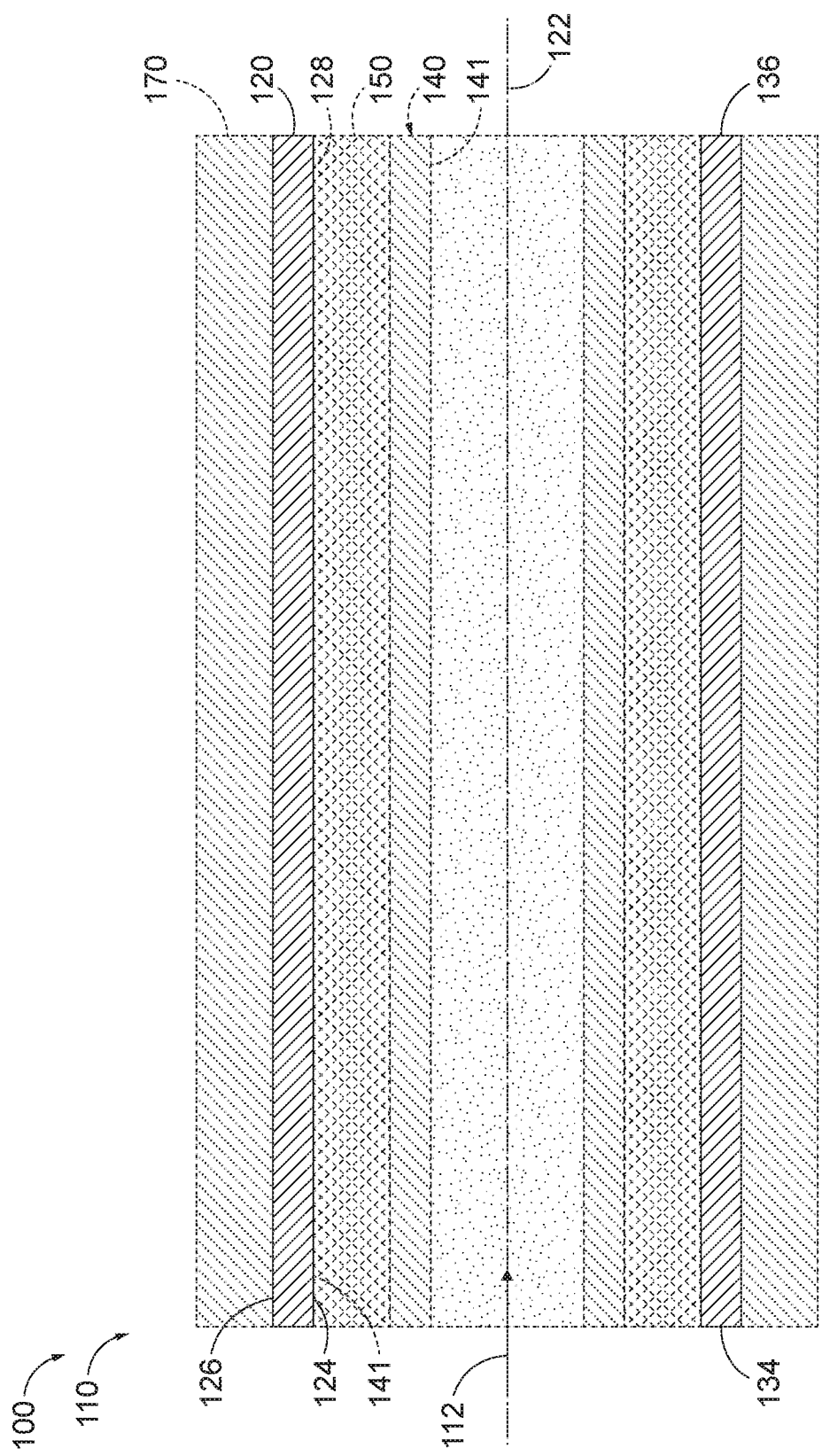
FIG. 2 is a schematic cross-sectional elevation view taken along the line 2-2 of FIG. 1.

FIG. 2 is a schematic cross-sectional illustration of a portion of SMA actuator assembly 110, taken along the line 2-2 in FIG. 1. As schematically illustrated in FIGS. 1-2, thermal management system 100 may include a process fluid tubular 140 that defines process fluid conduit 141. Process fluid conduit 141 may be configured such that the process fluid flows through SMA element 120. More specifically, and as schematically illustrated in FIG. 2, process fluid conduit 141 may extend between an upstream end 134 and a downstream end 136 of SMA element 120 such that process fluid conduit 141 is configured to receive the process fluid in heat exchange relation with SMA element 120. Stated differently, SMA actuator assembly 110 may be configured such that process fluid flow 112 flows through process fluid conduit 141 from upstream end 134 to downstream end 136 of SMA element 120.

As schematically illustrated in FIG. 2, process fluid tubular 140 may extend through an interior of SMA element 120. For example, process fluid tubular 140 may extend within an SMA element conduit 128 that is defined by SMA element 120. Process fluid tubular 140 may be at least substantially coaxial with SMA element 120. Additionally or alternatively, SMA element 120 may at least partially enclose process fluid tubular 140, and/or may define at least a portion of process fluid tubular 140 and/or of process fluid conduit 141. For example, in an embodiment in which SMA element 120 at least partially defines process fluid conduit 141, SMA element conduit 128 may include and/or be process fluid conduit 141. As a more specific example, in an embodiment in which process fluid tubular 140 does not extend through the interior of SMA element 120, the process fluid may flow through SMA element conduit 128 defined by SMA element 120 such that the process fluid is in contact with SMA element 120.

As further schematically illustrated in FIG. 2, SMA element 120 may define an interior surface 124 and an exterior surface 126. Interior surface 124 may at least partially define SMA element conduit 128, process fluid tubular 140, and/or process fluid conduit 141. Additionally or alternatively, process fluid tubular 140 may physically contact interior surface 124.

When SMA actuator assembly 110 includes process fluid tubular 140, SMA actuator assembly 110 also may include a thermal transfer material 150 extending between process fluid tubular 140 and interior surface 124. In such an embodiment, thermal transfer material 150 may be configured to enhance thermal communication, or thermal contact, between process fluid tubular 140 and SMA element 120. As examples, thermal transfer material 150 may include and/or be a liquid, a thermally conductive fluid, a heat transfer fluid, a packing material, a grease, a thermal grease, a solid structure, a resilient material, and/or a compressible material.

As further schematically illustrated in FIG. 2, SMA actuator assembly 110 additionally may include an insulation layer 170 at least substantially surrounding SMA element 120 and configured to restrict thermal communication between SMA element 120 and an ambient environment exterior insulation layer 170. For example, in an embodiment in which SMA element 120 does not extend within heat transfer region 182, it may be desirable that the temperature of the process fluid within SMA element 120 is not substantially affected by a temperature of the ambient environment exterior SMA element 120. Additionally or alternatively, it may be desirable that SMA element 120 be at the same temperature, or at least substantially the same temperature, as the process fluid, such as to facilitate SMA element 120 assuming a conformation responsive to the temperature of the process fluid. Hence, insulation layer 170 may facilitate SMA element 120 remaining at the same temperature, or at least substantially the same temperature, as the process fluid flowing within SMA element 120.

Figure 3:
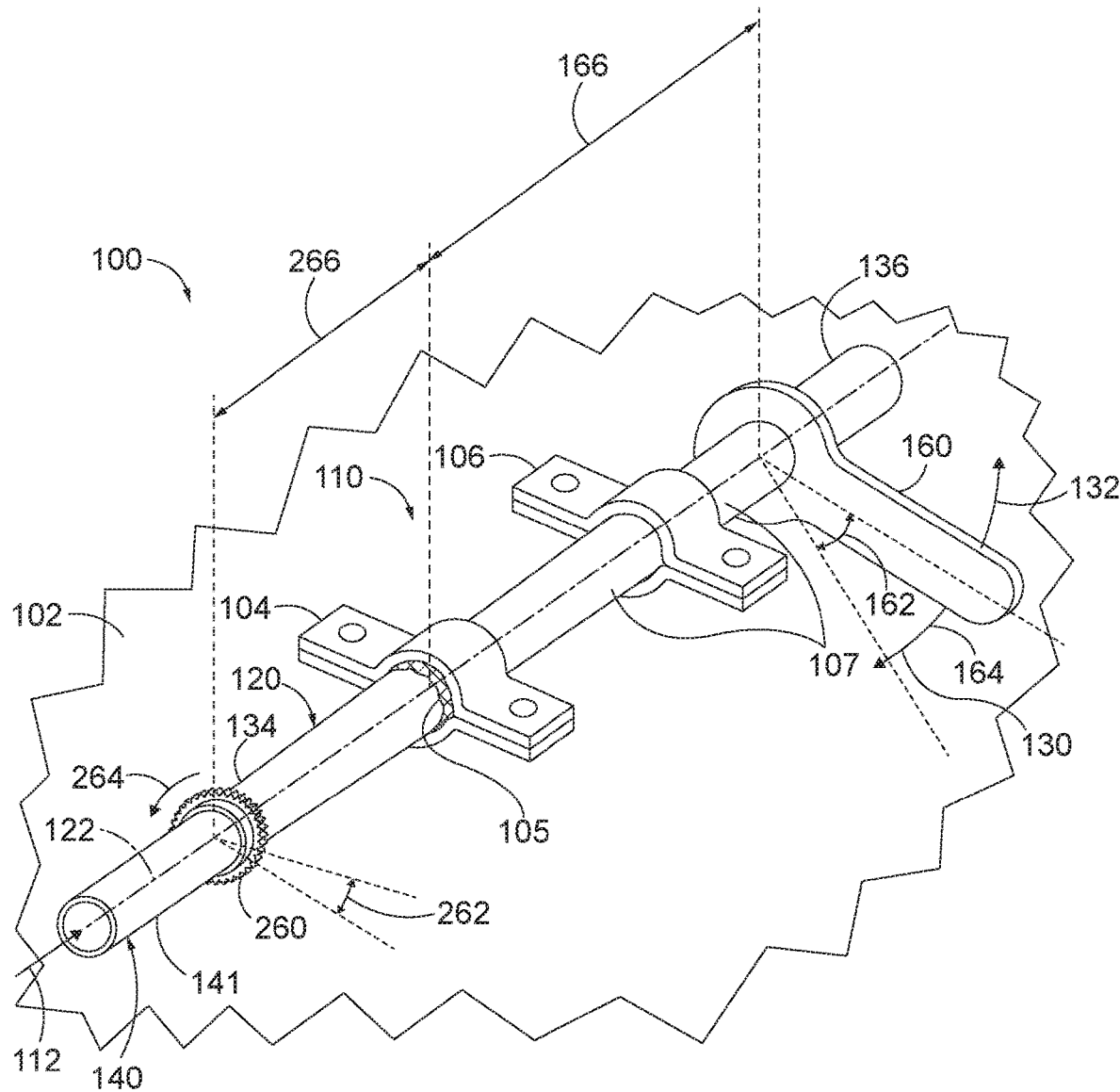
FIG. 3 is a front perspective view representing a shape memory alloy (SMA) actuator according to the present disclosure.

FIG. 3 is a less schematic illustration of a portion of thermal management system 100. As schematically illustrated in FIG. 1, and as less schematically illustrated in FIG. 3, thermal management system 100 may include a support structure 102 to which SMA element 120 is mounted. More specifically, and as illustrated in FIG. 3, SMA element 120 may be mounted to support structure 102 by at least one fixed coupling 104 configured to restrict a mounted region 105 of SMA element 120 from rotating with respect to support structure 102. For example, fixed coupling 104 may be statically coupled to support structure 102 (such as via a bolt and/or another mechanical fastener) and may be statically coupled to SMA element 120 (such as by an adhesive or weld) such that mounted region 105 of SMA element 120 proximal fixed coupling 104 is restricted from rotating with respect to support structure 102. Additionally or alternatively, and as further illustrated in FIG. 3, SMA element 120 may be mounted to support structure 102 by at least one bearing coupling 106 configured to permit a supported region 107 of SMA element 120 to rotate with respect to support structure 102.

FIG. 3 additionally illustrates an example of SMA element 120 twisting about central axis 122. More specifically, and as illustrated in FIG. 3, SMA element 120 may be configured to twist about central axis 122 such that actuation element 160 rotates about central axis 122 in a first torque direction 130 responsive to the temperature of SMA element 120 increasing, or being increased. SMA actuator assembly 110 further may be configured such that actuation element 160 rotates about central axis 122 in a second torque direction 132 that is opposite first torque direction 130 responsive to the temperature of SMA element 120 decreasing, or being decreased.

As illustrated in FIG. 3, actuation element 160 may be a first actuation element 160, and SMA actuator assembly 110 further may include a second actuation element 260. For example, in the embodiment of FIG. 3, first actuation element 160 has the form of a lever, and second actuation element 260 has the form of a gear. However, this is not required to all SMA actuator assemblies 110, and it is additionally within the scope of the present disclosure that first actuation element 160 and second actuation element 260 each may include and/or be any appropriate mechanism, and may be the same mechanism or different mechanisms. As additional examples, in an embodiment of thermal management system 100 that includes first actuation element 160 and second actuation element 260, each of first actuation element 160 and second actuation element 260 may include and/or be a gear, a spur gear, a worm gear, a lever, and/or a cam. In an embodiment of thermal management system 100 that includes first actuation element 160 and second actuation element 260, first actuation element 160 may be configured to actuate thermal management fluid inlet valve 186, and second actuation element 260 may be configured to actuate thermal management fluid outlet valve 188, as illustrated in FIG. 1.

With continued reference to FIG. 3, first actuation element 160 may be configured to rotate about central axis 122 through a first actuation angle 162 in a first actuation direction 164 responsive to the temperature of SMA element 120 increasing. Similarly, as additionally illustrated in FIG. 3, second actuation element 260 may be configured to rotate about central axis 122 through a second actuation angle 262 in a second actuation direction 264 responsive to the temperature of SMA element 120 increasing. Depending upon the construction of SMA actuator assembly 110 and/or of SMA element 120, first actuation direction 164 may be the same as second actuation direction 264, or may be opposite second actuation direction 264. For example, and as illustrated in FIG. 3, thermal management system 100 may include fixed coupling 104 positioned between first actuation element 160 and second actuation element 260 such that first actuation direction 164 and second actuation direction 264 are opposite one another.

Furthermore, SMA actuator assembly 110 may be configured such that first actuation angle 162 and second actuation angle 262 are at least substantially equal or may be configured such that first actuation angle 162 is different than second actuation angle 262. For example, in an embodiment of thermal management system 100 that includes fixed coupling 104, a magnitude of first actuation angle 162 may be proportional to a first actuation element distance 166 between fixed coupling 104 and first actuation element 160. Similarly, a magnitude of second actuation angle 262 may be proportional to a second actuation element distance 266 between fixed coupling 104 and second actuation element 260. Hence, first actuation angle 162 and second actuation angle 262 may be at least substantially equal when first actuation element distance 166 and second actuation element distance 266 are at least substantially equal. In this manner, absolute and/or relative magnitudes of each of first actuation angle 162 and second actuation angle 262 may be at least partially selected and/or determined by the first actuation element distance 166 and/or by second actuation element distance 266.

Figure 4:
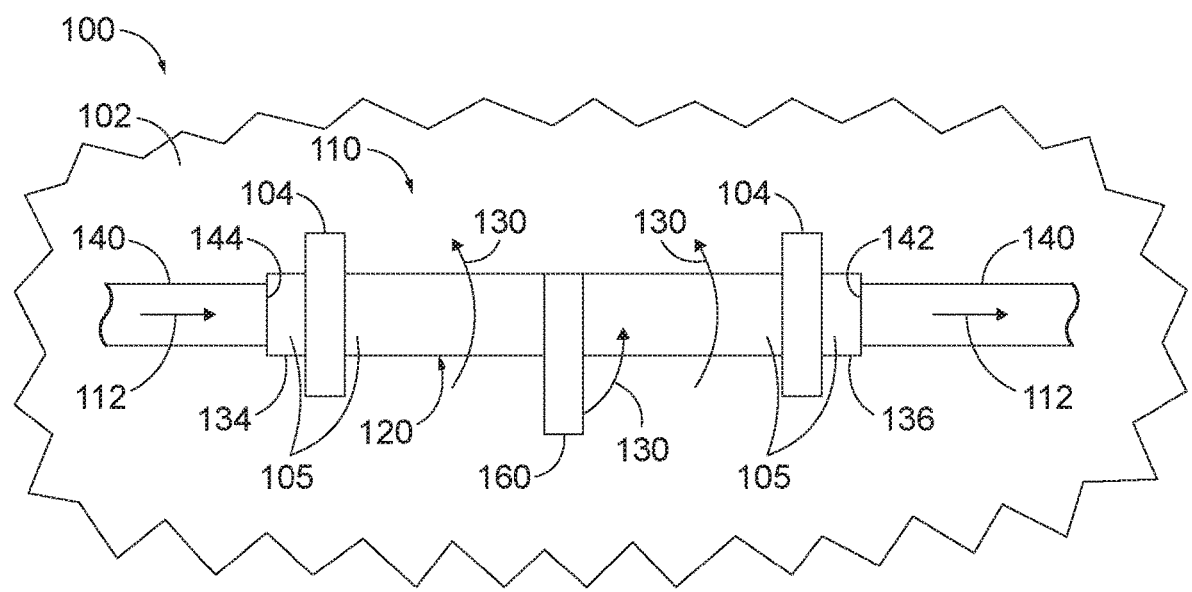
FIG. 4 is a schematic cutaway plan view representing an SMA actuator assembly coupled to a support structure by two fixed couplings according to the present disclosure.

FIG. 4 schematically illustrates another example of a portion of thermal management system 100 that includes fixed coupling 104. Specifically, in the embodiment of FIG. 4, SMA element 120 is coupled to support structure 102 by a pair of fixed couplings 104 positioned at opposite ends of SMA element 120. FIG. 4 additionally illustrates SMA actuator assembly 110 with actuation element 160 positioned between each of the pair of fixed couplings 104. In such an embodiment, SMA element 120 may be configured to twist in first torque direction 130 between each of the pair of fixed couplings 104 (such as responsive to the temperature of SMA element 120 increasing) such that actuation element 160 also rotates in first torque direction 130.

FIG. 4 additionally schematically illustrates an example of thermal management system 100 in which process fluid tubular 140 does not extend through SMA element 120. In such an embodiment, process fluid tubular 140 may be coupled to SMA element 120 such that process fluid flow 112 flows through process fluid tubular 140 and SMA element 120 sequentially. As an example, and as schematically illustrated in FIG. 4, process fluid tubular 140 may include a process fluid outlet 144 that is fluidly coupled to upstream end 134 of SMA element 120 and/or a process fluid inlet 142 that is fluidly coupled to downstream end 136 of SMA element 120. Additionally or alternatively, process fluid outlet 144 may be mechanically coupled to upstream end 134 of SMA element 120, and/or process fluid inlet 152 may be mechanically coupled to downstream end 136 of SMA element 120. More specifically, and as further schematically illustrated in FIG. 4, process fluid tubular 140 may be fluidly and/or mechanically coupled to at least one mounted region 105 of SMA element 120. Stated differently, a configuration in which upstream end 134 and downstream end 136 of SMA element 120 each are mounted to support structure 102 with respective fixed couplings 104 may permit process fluid tubular 140 to be mechanically coupled to each of upstream end 134 and downstream end 136 without upstream end 134 and/or downstream end 136 twisting with respect to process fluid tubular 140. In such an embodiment, process fluid tubular 140 may be described as including a plurality of spaced-apart segments, such that process fluid tubular 140 and SMA element 120 collectively define process fluid conduit 141.

Figure 5:
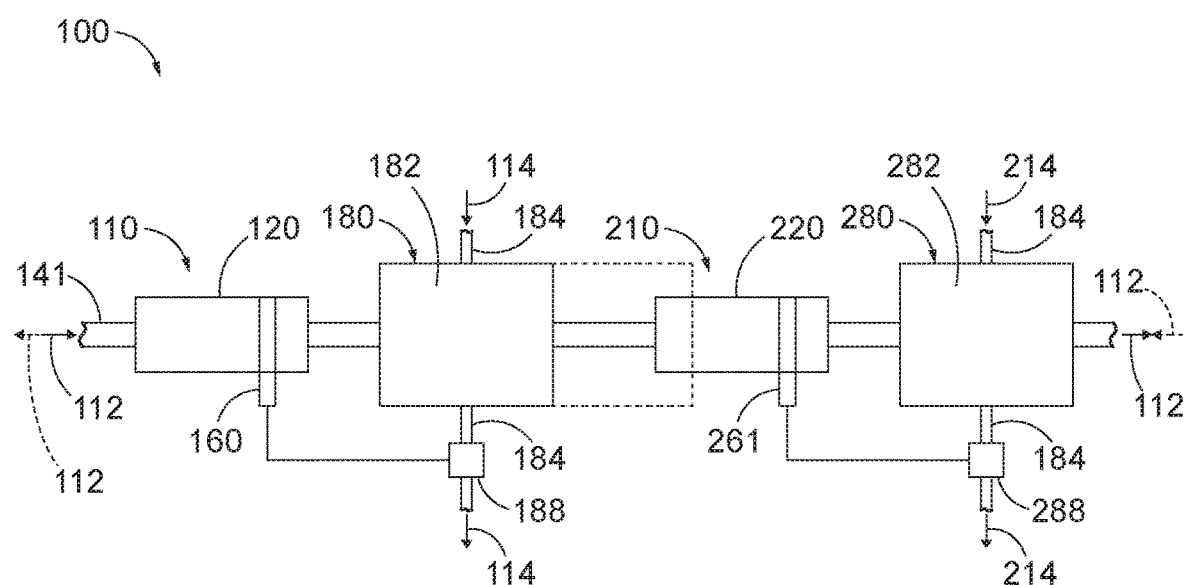
FIG. 5 is a schematic plan view representing a thermal management system that includes a plurality of SMA actuator assemblies and a plurality of heat exchangers according to the present disclosure.

FIG. 5 schematically illustrates an embodiment of thermal management system 100 that includes a plurality of SMA actuator assemblies 110. For example, and as schematically illustrated in FIG. 5, SMA actuator assembly 110 may be a first SMA actuator assembly 110 with a first SMA element 120, and thermal management system 100 further may include a second SMA actuator assembly 210 with a second SMA element 220. As additionally schematically illustrated in FIG. 5, actuation element 160 of first SMA actuator assembly 110 may be a first actuation element 160, and second SMA actuator assembly 210 may include a second actuation element 261. In the example of FIG. 5, first actuation element 160 is configured to selectively actuate a first thermal management fluid outlet valve 188 associated with a first thermal management fluid flow 114, and second actuation element 261 is configured to selectively actuate a second thermal management fluid outlet valve 288 associated with a second thermal management fluid flow 214. More specifically, in the example of FIG. 5, first thermal management fluid flow 114 flows through a first heat transfer region 182 of a first heat exchanger 180, and second thermal management fluid flow 214 flows through a second heat transfer region 282 of a second heat exchanger 280.

In an embodiment of thermal management system 100 that includes first SMA actuator assembly 110 and second SMA actuator assembly 210, thermal management system 100 may be configured to change the temperature of the process fluid at any appropriate location along process fluid flow 112. For example, thermal management system 100 may be configured to change the temperature of the process fluid within first heat transfer region 182 prior to the process fluid flowing through second SMA element 220. In such an embodiment, the thermal transfer between process fluid flow 112 and thermal management fluid flow 114 within first heat transfer region 182 may be described as an initial thermal transfer stage, and the thermal transfer between process fluid flow 112 and thermal management fluid flow 114 within second heat transfer region 282 may be described as a supplemental thermal transfer stage. The supplemental thermal transfer stage may correspond to a temperature change of the process fluid that is smaller than a temperature change of the process fluid in the initial thermal transfer stage. Such a configuration, in which the initial thermal transfer stage and the supplemental thermal transfer stage occur sequentially, may serve to reduce an amount of thermal management fluid that is needed to produce a given temperature change in the process fluid relative to an otherwise identical thermal management system 100 that includes only a single SMA actuator assembly 110 and a single heat exchanger 180. Such a configuration also may facilitate protecting the process fluid from being overcooled or overheated relative to a desired control temperature of the process fluid. Additionally or alternatively, thermal management system 100 may be configured to change the temperature of the process fluid within first heat transfer region 182 while the process fluid flows through second SMA element 220. For example, and as schematically illustrated in dashed lines in FIG. 5, second SMA element 220 may extend at least partially within first heat transfer region 182 such that process fluid flow 112 within second SMA element 220 is in thermal communication with thermal management fluid flow 114 through first heat transfer region 182. It also is within the scope of the present disclosure that thermal management system 100 may be configured to change the temperature of the process fluid within first heat transfer region 182 subsequent to the process fluid flowing through second SMA element 220. For example, and as illustrated in dashed lines in FIG. 5, process fluid flow 112 may be directed such that the process fluid flows through at least a portion of second SMA element 220 prior to flowing through first heat transfer region 182.

Figure 6:
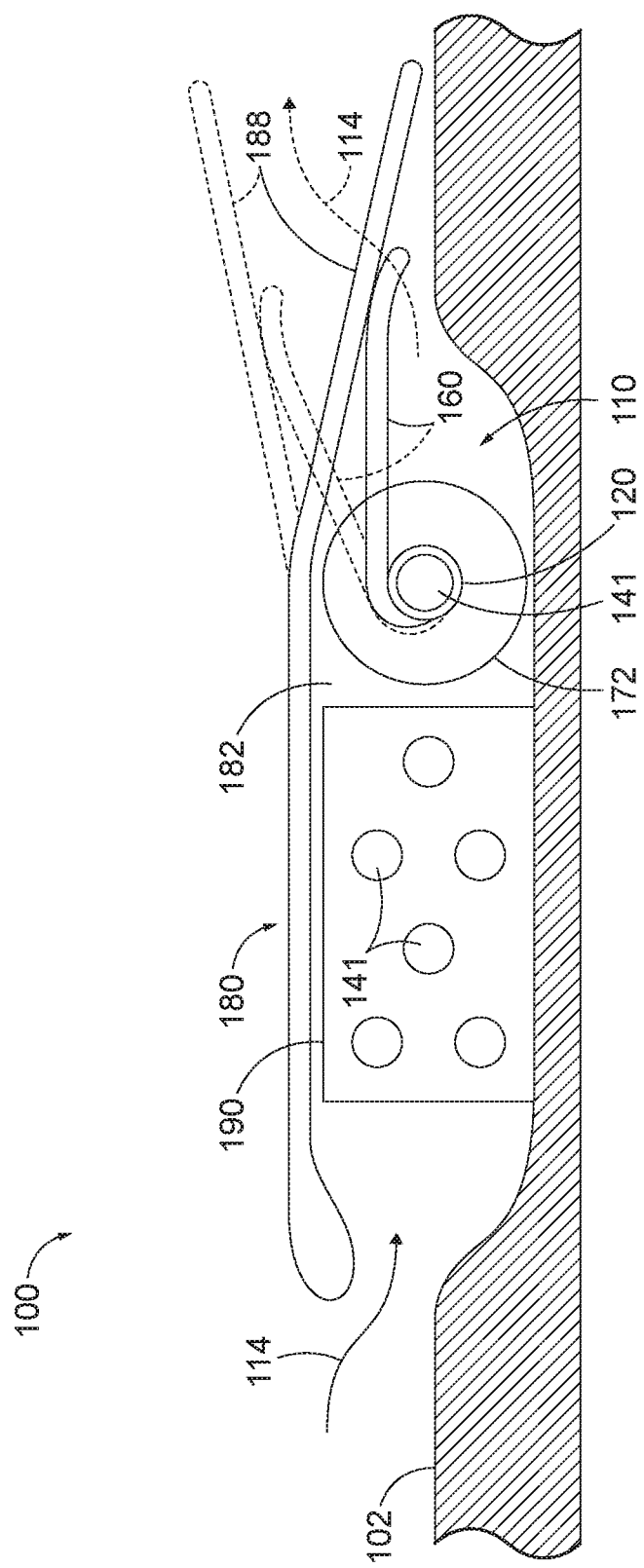
FIG. 6 is an end elevation view representing an SMA actuator assembly positioned downstream of a complementary heat exchange core in a heat transfer region according to the present disclosure.

FIG. 6 illustrates an example of thermal management system 100 that includes SMA element 120 positioned within heat transfer region 182. In the example of FIG. 6, SMA actuator assembly 110 includes actuation element 160 in the form of a lever that selectively pivots thermal management fluid outlet valve 188 between the fully closed configuration (illustrated in solid lines) and the fully open configuration (illustrated in dashed lines). As further illustrated in FIG. 6, thermal management system 100 additionally may include an complementary heat exchange core 190 positioned within heat transfer region 182 such that at least a portion of process fluid flow 112 flows through complementary heat exchange core 190 (as schematically illustrated in FIG. 1). For example, and as illustrated in FIG. 6, complementary heat exchange core 190 may include a plurality of process fluid conduits 141. As a more specific example, complementary heat exchange core 190 may include and/or be an air-oil heat exchange core. As illustrated in FIG. 6, SMA element 120 may be positioned downstream of complementary heat exchange core 190 with respect to thermal management fluid flow 114. However, this is not required to all thermal management systems 100, and it is additionally within the scope of the present disclosure that SMA element 120 may be positioned upstream of complementary heat exchange core 190 with respect to thermal management fluid flow 114 or parallel with complementary heat exchange core 190 with respect to thermal management fluid flow 114.

In an embodiment of thermal management system 100 that includes complementary heat exchange core 190, the process fluid may flow through complementary heat exchange core 190 and SMA element 120 in any appropriate sequence. For example, thermal management system 100 may be configured such that the process fluid exiting complementary heat exchange core 190 is combined with the process fluid exiting SMA element 120. Additionally or alternatively, thermal management system 100 may be configured such that the process fluid flows through complementary heat exchange core 190 and SMA element 120 sequentially.

Figure 7:
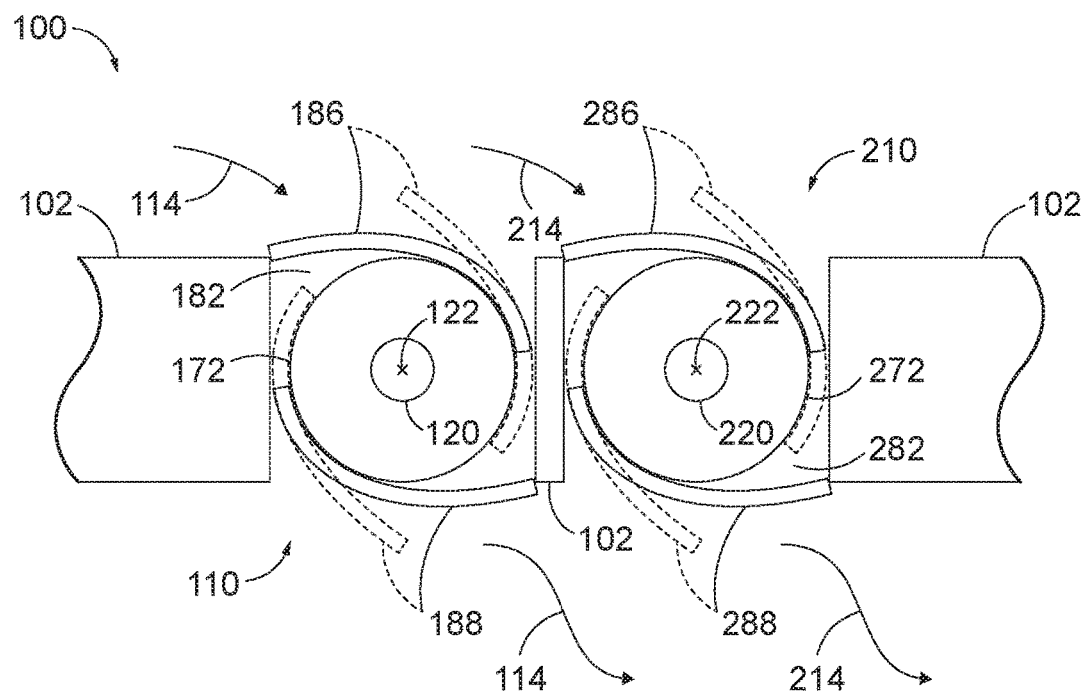
FIG. 7 is a schematic end elevation view representing a portion of a thermal management system that includes a pair of SMA actuator assemblies that actuate a pair of thermal management fluid inlet valves and a pair of thermal management fluid outlet valves according to the present disclosure.

FIG. 7 illustrates another example of thermal management system 100 that includes a plurality of SMA actuator assemblies 110. More specifically, in the example of FIG. 7, thermal management system 100 includes first SMA actuator assembly 110 positioned within first heat transfer region 182 and includes second SMA actuator assembly 210 positioned within second heat transfer region 282. While FIG. 7 illustrates an example of thermal management system 100 that includes two SMA actuator assemblies 110, this is not required to all thermal management systems 100, and it is additionally within the scope of the present disclosure that thermal management system 100 may include at least 2 SMA actuator assemblies 110, at least 5 SMA actuator assemblies 110, at least 10 SMA actuator assemblies 110, at least 20 SMA actuator assemblies 110, at least 50 SMA actuator assemblies 110, and at most 100 SMA actuator assemblies 110.

As illustrated in FIG. 7, SMA actuator assembly 110 includes a first thermal management fluid inlet valve 186 and a first thermal management fluid outlet valve 188 that are coupled to first SMA element 120. Hence, as first SMA element 120 twists about a first central axis 122 thereof, each of first thermal management fluid inlet valve 186 and first thermal management fluid outlet valve 188 rotates about first central axis 122 to transition between the fully closed configuration (illustrated in solid lines in FIG. 7) and the fully open configuration (illustrated in dashed lines in FIG. 7). In this manner, the twisting of first SMA element 120 selectively permits first thermal management fluid flow 114 to flow through first heat transfer region 182 in heat exchange relation with first SMA element 120. Similarly, second SMA actuator assembly 210 includes a second thermal management fluid inlet valve 286 and a second thermal management fluid outlet valve 288 that are coupled to second SMA element 220. Hence, as second SMA element 220 twists about a second central axis 222 thereof, each of second thermal management fluid inlet valve 286 and second thermal management fluid outlet valve 288 rotates about second central axis 222 to transition between the fully closed configuration (illustrated in solid lines in FIG. 7) and the fully open configuration (illustrated in dashed lines in FIG. 7). In this manner, the twisting of second SMA element 220 selectively permits second thermal management fluid flow 214 to flow through second heat transfer region 282 in heat exchange relation with second SMA element 220.

FIG. 7 may be described as illustrating a parallel configuration of thermal management system 100 in which each of first thermal management fluid flow 114 and second thermal management fluid flow 214 may be at substantially the same temperature prior to flowing through first heat transfer region 182 and second heat transfer region 282. In such a configuration, second thermal management fluid flow 214 may serve to more efficiently regulate the temperature of the process fluid flowing through second heat transfer region 182 relative to a serial configuration in which second thermal management fluid flow 214 flowing into second heat transfer region 282 includes at least a portion of first thermal management fluid flow 114 flowing out of first heat transfer region 182. Accordingly, an example of thermal management system 100 in such a parallel configuration may be smaller and/or more efficient than an example of thermal management system 100 in a serial configuration.

SMA element 120 may have and/or be characterized by a crystalline structure thereof. For example, SMA element 120 may be configured to transition from a martensite state to an austenite state responsive to the temperature of SMA element 120 increasing, and may be configured to transition from the austenite state to the martensite state responsive to the temperature of SMA element 120 decreasing. In such an embodiment, SMA element 120 may be in the first conformation when SMA element 120 is in the martensite state, and may be in the second conformation when in the austenite state.

Figure 8:
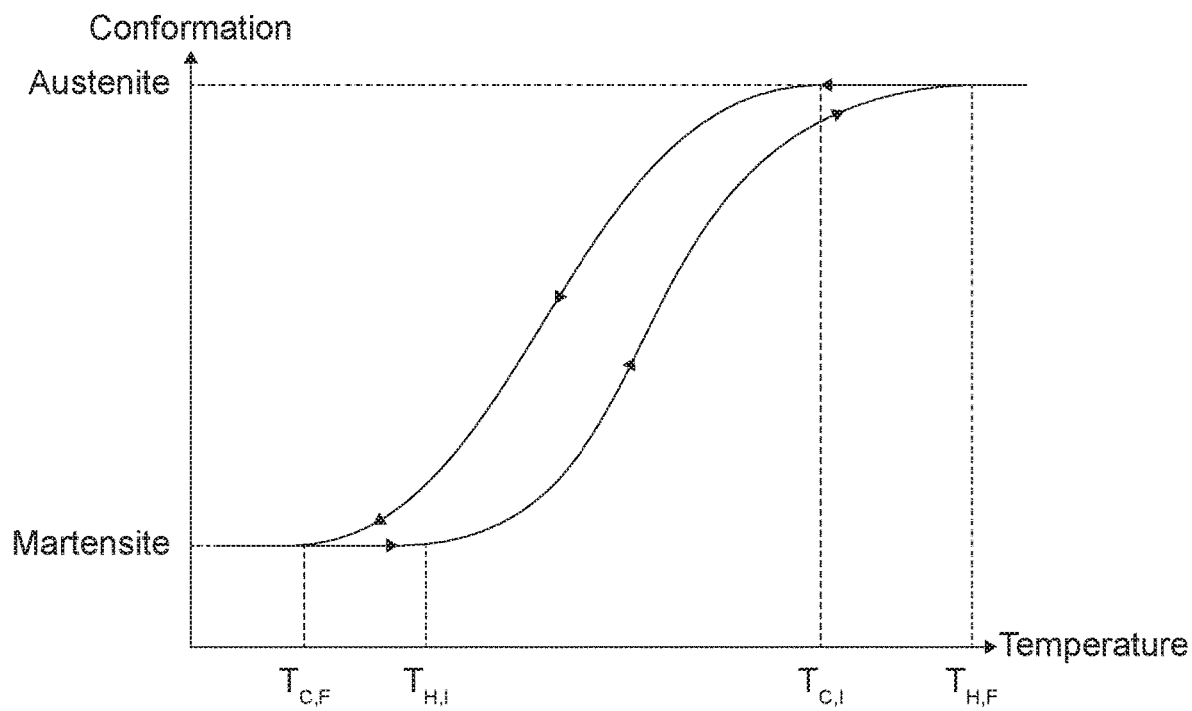
FIG. 8 is an illustration of a hysteresis curve according to the present disclosure.

A temperature-dependent transition between the austenite state and the martensite state of SMA element 120 may have any appropriate form. FIG. 8 illustrates an example of a hysteresis curve that illustrates a relationship between the conformation of SMA element 120 and the temperature of SMA element 120. As illustrated in FIG. 8, SMA element 120 may be configured to begin a transition from the martensite state to the austenite state when SMA element 120 reaches an initial heating temperature (labeled $T_{H,I}$ in FIG. 8) from below (i.e., from a temperature that is lower than the initial heating temperature). SMA element 120 may be configured to transition from the martensite state to the austenite state as the temperature of SMA element 120 is increased. Specifically, and as illustrated in FIG. 8, SMA element 120 may be configured to complete the transition from the martensite state to the austenite state upon reaching a final heating temperature (labeled $T_{H,F}$ in FIG. 8) that is greater than the initial heating temperature.

As further illustrated in FIG. 8, SMA element 120 may be configured to begin a transition from the austenite state to the martensite state upon reaching an initial cooling temperature (labeled $T_{C,I}$ in FIG. 8) from above (i.e., from a temperature that is greater than the initial cooling temperature). SMA element 120 may be configured to transition from the austenite state to the martensite state as the temperature of SMA element 120 is decreased. Specifically, and as illustrated in FIG. 8, SMA element 120 may be configured to complete the transition from the austenite state to the martensite state upon reaching a final cooling temperature (labeled $T_{C,F}$ in FIG. 8) that is less than the initial cooling temperature. As additionally illustrated in FIG. 8, the initial heating temperature may be greater than the final cooling temperature, and/or the final heating temperature may be greater than the initial cooling temperature.

In this manner, and as illustrated in FIG. 8, a crystalline structure of SMA element 120 (and hence a rotational position of actuation element 160 coupled to SMA element 120) may depend upon both the temperature of SMA element 120 as well as a history of the temperature of SMA element 120 when the temperature is between the final cooling temperature and the final heating temperature. However, and as further illustrated in FIG. 8, SMA element 120 may be configured to remain in the austenite state when the temperature of SMA element 120 is greater than the final heating temperature, and/or may be configured to remain in the martensite state when the temperature of SMA element 120 is less than the final cooling temperature. Accordingly, SMA element 120 may be configured and/or calibrated such that the final cooling temperature is higher than a minimum operational temperature of SMA element 120, and/or such that the final heating temperature is lower than a maximum operational temperature of SMA element 120. As an example, the minimum operational temperature of SMA element 120 may correspond to and/or be at least substantially equal to a desired control temperature of the process fluid, and/or the maximum operational temperature of SMA element 120 may correspond to and/or be at least substantially equal to a maximum expected temperature of the process fluid. As another example, the minimum operational temperature of SMA element 120 may correspond to and/or be at least substantially equal to a minimum expected temperature of the process fluid, and/or the maximum operational temperature of SMA element 120 may correspond to and/or be at least substantially equal to a desired control temperature of the process fluid. Stated differently, SMA element 120 may be selected, tailored, trained, and/or otherwise configured such that the minimum and/or maximum operational temperatures of SMA element 120 correspond to the minimum and/or maximum expected and/or desired temperatures of the process fluid. Such a configuration may facilitate a precise and/or reliable determination of a rotational position of actuation element 160 coupled to SMA element 120 as SMA element 120 is transitioned between the minimum operational temperature and the maximum operational temperature.

Figure 9:
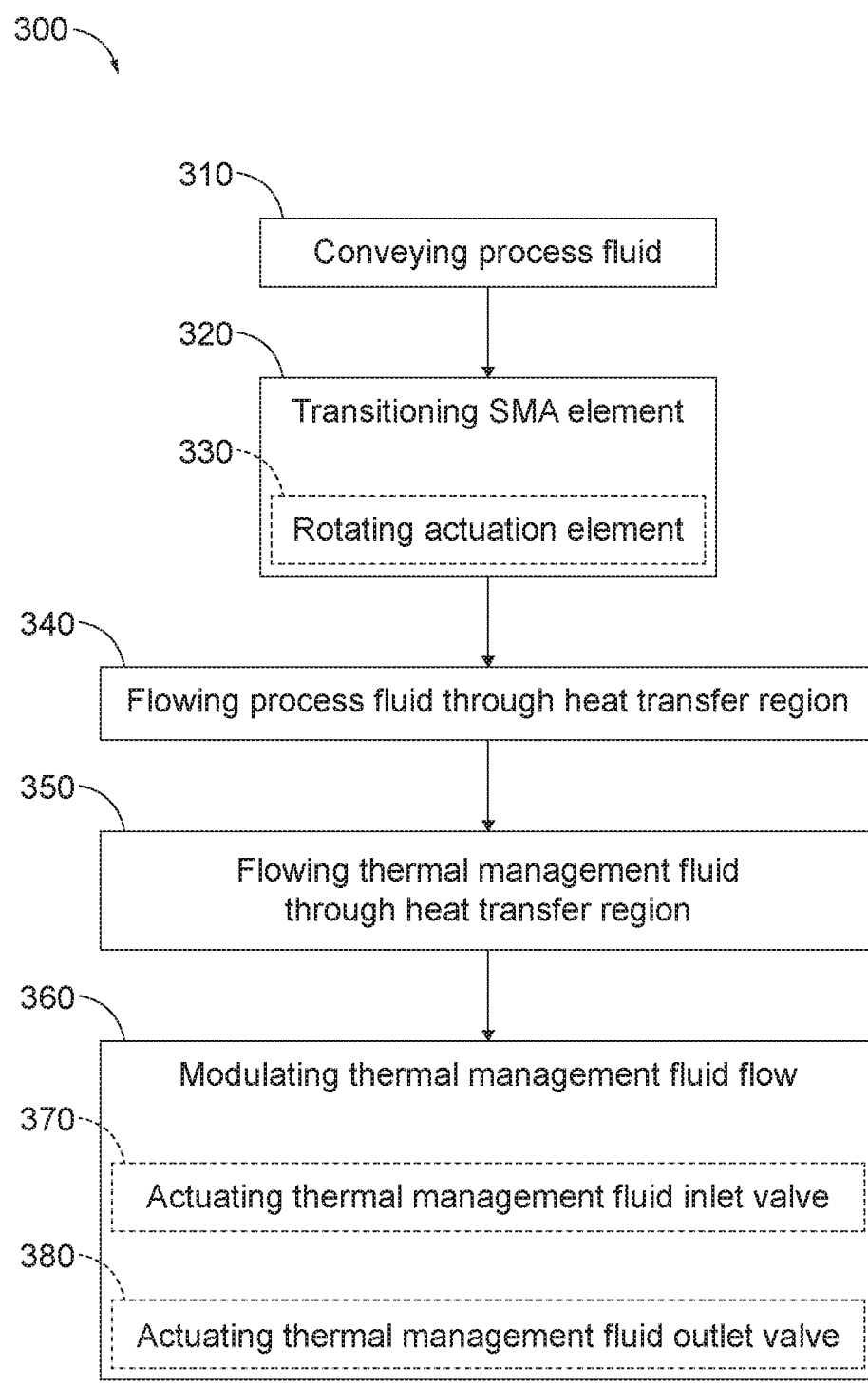
FIG. 9 is a flowchart depicting methods of passively regulating a temperature of a process fluid according to the present disclosure.

FIG. 9 is a flowchart depicting methods 300, according to the present disclosure, of passively regulating a temperature of a process fluid. As shown in FIG. 9, a method 300 includes conveying, at 310, a process fluid in heat exchange relation with a shape memory alloy (SMA) element (such as SMA element 120) such that the process fluid is in thermal contact with the SMA element. Method 300 further includes transitioning, at 320, the SMA element to assume a conformation among a plurality of conformations between a first conformation and a second conformation based upon a temperature of the process fluid that is in thermal contact with the SMA element. Method 300 still further includes flowing, at 340, a process fluid flow (such as process fluid flow 112) through a heat transfer region (such as heat transfer region 182), and flowing, at 350, a thermal management fluid flow (such as thermal management fluid flow 114) through the heat transfer region. Method 300 additionally includes modulating, at 360, the thermal management fluid flow through the heat transfer region to regulate the temperature of the process fluid flow that flows through the heat transfer region. The modulating at 360 is responsive to the transitioning at 320.

The transitioning at 320 may include transitioning the SMA element in any appropriate manner. For example, the transitioning at 320 may include twisting the SMA element about a central axis (such as central axis 122). Additionally or alternatively, and as shown in FIG. 9, the transitioning at 320 may include rotating, at 330, an actuation element (such as actuation element 160) that is coupled to the SMA element about the central axis. For example, the rotating at 330 may include rotating the actuation element about the central axis in a first torque direction (such as first torque direction 130) responsive to a temperature of the SMA element increasing. Additionally or alternatively, the rotating at 330 may include rotating the actuation element about the central axis in a second torque direction (such as second torque direction 132) responsive to the temperature of the SMA element decreasing, such that the second torque direction is opposite the first torque direction.

The modulating at 360 may be performed in any appropriate manner. For example, and as shown in FIG. 9, the modulating at 360 may include actuating, at 370, a thermal management fluid inlet valve (such as thermal management fluid inlet valve 186) and/or actuating, at 380, a thermal management fluid outlet valve (such as thermal management fluid outlet valve 188) with the actuation element.

The steps of method 300 may be performed in any appropriate sequence. For example, the conveying at 310 may be performed at least partially concurrently with the flowing at 340, may be performed prior to the flowing at 340, and/or may be performed subsequent to the flowing at 340.

Illustrative, non-exclusive examples of inventive subject matter according to the present disclosure are described in the following enumerated paragraphs:

A1. A thermal management system configured to regulate a temperature of a process fluid via thermal exchange between the process fluid and a thermal management fluid, the thermal management system comprising:

a heat transfer region within which the thermal exchange between the process fluid and the thermal management fluid occurs;

a process fluid conduit configured to convey a process fluid flow of the process fluid in heat exchange relation with the heat transfer region;

a thermal management fluid conduit configured to convey a thermal management fluid flow of the thermal management fluid in heat exchange relation with the heat transfer region; and a shape memory alloy (SMA) actuator assembly configured to selectively regulate a flow rate of the thermal management fluid that is conveyed in heat exchange relation with the heat transfer region, the SMA actuator assembly including:

(i) an SMA element that is in thermal contact with the process fluid and configured to assume a conformation among a plurality of conformations defined between a first conformation and a second conformation, wherein the conformation of the SMA element is based, at least in part, on a temperature of the process fluid that is in thermal contact with the SMA element; and (ii) an actuation element coupled to the SMA element, wherein the actuation element is configured to assume a position among a plurality of positions defined between a restrictive position, in which the actuation element restricts flow of the thermal management fluid within the thermal management fluid conduit, and an open position, in which the actuation element permits flow of the thermal management fluid within the thermal management fluid conduit, and further wherein the position of the actuation element is based, at least in part, on the conformation of the SMA element.

A2. The thermal management system of paragraph A1, wherein:

(i) the SMA element is configured to twist about a central axis to transition among the plurality of conformations; and (ii) the actuation element is configured to rotate about the central axis in a first torque direction responsive to a temperature of the SMA element increasing and to rotate about the central axis in a second torque direction, which is opposite the first torque direction, responsive to the temperature of the SMA element decreasing.

A3. The thermal management system of any of paragraphs A1-A2, wherein the thermal management system is configured to bring the thermal management fluid into thermal contact with the process fluid within the heat transfer region to change the temperature of the process fluid.

A4. The thermal management system of any of paragraphs A1-A3, wherein the thermal management system further includes a heat exchanger that defines the heat transfer region.

A5. The thermal management system of any of paragraphs A1-A4, wherein the process fluid conduit is configured such that the process fluid flows through the SMA element.

A6. The thermal management system of paragraph A5, wherein the process fluid conduit extends between an upstream end of the SMA element and a downstream end of the SMA element and is configured to receive the process fluid in heat exchange relation with the SMA element.

A7. The thermal management system of any of paragraphs A1-A6, wherein the thermal management system further includes a thermal management fluid tubular that at least partially defines the thermal management fluid conduit.

A7.1. The thermal management system of paragraph A7, wherein the thermal management fluid tubular has a cross-sectional shape that is at least one of circular, triangular, rectangular, and elliptical.

A7.2. The thermal management system of any of paragraphs A7-A7.1, wherein the thermal management fluid tubular includes at least one heat transfer enhancing element.

A7.3. The thermal management system of paragraph A7.2., wherein the at least one heat transfer enhancing element includes at least one of a straight fin, a wavy fin, a pair of offset fins, a pin, and a dimple.

A8. The thermal management system of any of paragraphs A1-A7.3, wherein the SMA actuator assembly defines at least one of:

(i) a thermal management fluid inlet valve configured to selectively permit the thermal management fluid flow to enter the heat transfer region; and (ii) a thermal management fluid outlet valve configured to selectively permit the thermal management fluid flow to exit the heat transfer region; and wherein the actuation element is configured to selectively actuate the at least one of the thermal management fluid inlet valve and the thermal management fluid outlet valve.

A9. The thermal management system of paragraph A8, wherein the actuation element is configured to selectively actuate the at least one of the thermal management fluid inlet valve and the thermal management fluid outlet valve between a fully closed configuration and a fully open configuration.

A10. The thermal management system of paragraph A9, wherein the actuation element further is configured to selectively actuate the at least one of the thermal management fluid inlet valve and the thermal management fluid outlet valve to at least one partially open configuration that is between the fully closed configuration and the fully open configuration.

A11. The thermal management system of any of paragraphs A1-A10, wherein the actuation element includes at least one of a gear, a spur gear, a worm gear, a lever, and a cam.

A12. The thermal management system of any of paragraphs A1-A11, wherein the SMA element includes an SMA torque tube.

A13. The thermal management system of paragraph A12, wherein the SMA torque tube is at least one of tubular and cylindrical.

A14. The thermal management system of any of paragraphs A12-A13, wherein the SMA torque tube is a hollow SMA torque tube.

A15. The thermal management system of any of paragraphs A1-A14, wherein the SMA element defines an interior surface and an exterior surface.

A16. The thermal management system of paragraph A15, wherein the interior surface at least partially defines the process fluid conduit.

A17. The thermal management system of any of paragraphs A1-A16, wherein the process fluid includes at least one of a liquid, water, a lubricant, and an oil.

A18. The thermal management system of any of paragraphs A1-A17, wherein the thermal management fluid includes at least one of a gas, air, a liquid, water, and an organic compound.

A19. The thermal management system of any of paragraphs A1-A18, wherein the SMA element is at least substantially formed of a shape memory alloy.

A20. The thermal management system of paragraph A19, wherein the shape memory alloy includes and/or is at least one of a binary alloy; a nickel-titanium alloy; a binary nickel-titanium alloy; a ternary alloy; a ternary alloy that includes nickel and titanium; a ternary nickel-titanium-palladium alloy; a ternary manganese-nickel-cobalt alloy; a quaternary alloy; a quaternary alloy that includes nickel and titanium; and an alloy that includes at least one of nickel, titanium, palladium, manganese, hafnium, copper, iron, silver, cobalt, chromium, and vanadium.

A21. The thermal management system of any of paragraphs A1-A20, wherein the thermal management system further includes a support structure, and wherein the SMA element is mounted to the support structure.

A22. The thermal management system of paragraph A21, wherein the SMA element is mounted to the support structure by at least one fixed coupling configured to restrict a mounted region of the SMA element from rotating with respect to the support structure.

A23. The thermal management system of paragraph A22, wherein the SMA element has a/the upstream end and a/the downstream end, wherein the upstream end is mounted to the support structure by a first fixed coupling, and wherein the downstream end is mounted to the support structure by a second fixed coupling.

A24. The thermal management system of any of paragraphs A21-A23, wherein the SMA element is mounted to the support structure by at least one bearing coupling configured to permit a supported region of the SMA element to rotate with respect to the support structure.

A25. The thermal management system of any of paragraphs A1-A24, wherein the actuation element is a first actuation element, and wherein the SMA actuator assembly further includes a second actuation element.

A26. The thermal management system of paragraph A25, wherein the first actuation element is configured to rotate about the central axis through a first actuation angle in a first actuation direction responsive to the temperature of the SMA element increasing, and wherein the second actuation element is configured to rotate about the central axis through a second actuation angle in a second actuation direction responsive to the temperature of the SMA element increasing.

A27. The thermal management system of paragraph A26, wherein the first actuation direction is the same as the second actuation direction.

A28. The thermal management system of paragraph A26, wherein the first actuation direction is opposite the second actuation direction.

A29. The thermal management system of any of paragraphs A25-A28, when dependent from paragraph A22, wherein the fixed coupling is positioned between the first actuation element and the second actuation element.

A30. The thermal management system of paragraph A29, wherein a magnitude of the first actuation angle is proportional to a first actuation element distance between the fixed coupling and the first actuation element.

A31. The thermal management system of any of paragraphs A29-A30, wherein a magnitude of the second actuation angle is proportional to a second actuation element distance between the fixed coupling and the second actuation element.

A32. The thermal management system of any of paragraphs A26-A31, wherein the first actuation angle and the second actuation angle are at least substantially equal.

A33. The thermal management system of any of paragraphs A26-A31, wherein the first actuation angle is different than the second actuation angle.

A34. The thermal management system of any of paragraphs A25-A33, when dependent from paragraph A8, wherein the SMA actuator assembly defines the thermal management fluid inlet valve and the thermal management fluid outlet valve; wherein the first actuation element is configured to actuate the thermal management fluid inlet valve; and wherein the second actuation element is configured to actuate the thermal management fluid outlet valve.

A35. The thermal management system of any of paragraphs A1-A34, wherein the thermal management system is configured to decrease the temperature of the process fluid.

A36. The thermal management system of any of paragraphs A1-A35, wherein the thermal management system is configured to increase the temperature of the process fluid.

A37. The thermal management system of any of paragraphs A1-A36, wherein the thermal management system is configured to change the temperature of the process fluid subsequent to the process fluid flowing through the SMA element.

A38. The thermal management system of any of paragraphs A1-A37, wherein the thermal management system is configured to change the temperature of the process fluid while the process fluid flows through the SMA element.

A39. The thermal management system of any of paragraphs A1-A38, wherein the thermal management system is configured to change the temperature of the process fluid prior to the process fluid flowing through the SMA element.

A40. The thermal management system of any of paragraphs A1-A39, wherein the SMA element at least one of:
(i) is positioned at least partially within the heat transfer region; and
(ii) fluidly isolates the process fluid flow from the thermal management fluid flow during the thermal exchange between the process fluid flow and the thermal management fluid flow.

A41. The thermal management system of paragraph A40, wherein the SMA actuator assembly further includes at least one heat spreader in thermal communication with the SMA element, wherein the at least one heat spreader is configured to enhance a thermal communication between the thermal management fluid and the SMA element.

A42. The thermal management system of paragraph A41, wherein the at least one heat spreader includes at least one of a heat sink, a fin, a circular fin, and a plate.

A43. The thermal management system of any of paragraphs A41-A42, wherein the at least one heat spreader is coupled to the SMA element such that the at least one heat spreader permits the SMA element to twist about a/the central axis.

A44. The thermal management system of any of paragraphs A41-A43, wherein the at least one heat spreader includes a plurality of spaced-apart heat spreaders positioned along a length of the SMA element.

A45. The thermal management system of any of paragraphs A1-A44, wherein the thermal management system further includes a process fluid tubular that defines the process fluid conduit.

A46. The thermal management system of paragraph A45, wherein the process fluid tubular extends through an interior of the SMA element.

A47. The thermal management system of paragraph A46, wherein the process fluid tubular extends within an SMA element conduit that is defined by the SMA element.

A48. The thermal management system of any of paragraphs A45-A47, wherein the process fluid tubular is at least substantially coaxial with the SMA element.

A49. The thermal management system of any of paragraphs A45-A48, wherein the SMA element at least partially encloses the process fluid tubular.

A50. The thermal management system of any of paragraphs A45-A49, wherein the SMA element defines at least a portion of the process fluid tubular.

A51. The thermal management system of any of paragraphs A45-A50, wherein the process fluid tubular physically contacts an/the interior surface of the SMA element.

A52. The thermal management system of any of paragraphs A45-A51, wherein the SMA actuator assembly further includes a thermal transfer material extending between the process fluid tubular and an/the interior surface of the SMA element, wherein the thermal transfer material is configured to enhance thermal communication between the process fluid tubular and the SMA element.

A53. The thermal management system of paragraph A52, wherein the thermal transfer material includes at least one of a liquid, a thermally conductive fluid, a heat transfer fluid, a packing material, a grease, a thermal grease, a solid structure, a resilient material, and a compressible material.

A54. The thermal management system of any of paragraphs A1-A53, wherein the SMA element defines at least a portion of the process fluid conduit.

A55. The thermal management system of any of paragraphs A1-A54, wherein the process fluid tubular is coupled to the SMA element such that the process fluid flows through the process fluid tubular and the SMA element sequentially.

A56. The thermal management system of paragraph A55, wherein the process fluid tubular includes at least one of a process fluid inlet that is fluidly coupled to the downstream end of the SMA element and a process fluid outlet that is fluidly coupled to the upstream end of the SMA element.

A57. The thermal management system of any of paragraphs A55-A56, wherein the process fluid tubular is fluidly coupled to a/the mounted region of the SMA element.

A58. The thermal management system of any of paragraphs A1-A57, wherein the SMA actuator assembly further includes an insulation layer at least substantially surrounding the SMA element, wherein the insulation layer is configured to restrict thermal communication between the SMA element and an ambient environment exterior the insulation layer.

A59. The thermal management system of any of paragraphs A1-A58, wherein the thermal management system further includes an complementary heat exchange core positioned within the heat transfer region, wherein the thermal management system is configured such that at least a portion of the process fluid flows through the complementary heat exchange core.

A60. The thermal management system of paragraph A59, wherein the complementary heat exchange core includes an air-oil heat exchange core.

A61. The thermal management system of any of paragraphs A59-A60, wherein the thermal management system is configured such that process fluid exiting the complementary heat exchange core is combined with process fluid exiting the SMA element.

A62. The thermal management system of any of paragraphs A59-A61, wherein the SMA element is positioned downstream of the complementary heat exchange core with respect to the thermal management fluid flow.

A63. The thermal management system of any of paragraphs A59-A62, wherein the thermal management system is configured such that the process fluid flows through the complementary heat core and the SMA element sequentially.

A64. The thermal management system of any of paragraphs A1-A63, wherein the thermal management system includes a plurality of SMA actuator assemblies.

A65. The thermal management system of paragraph A64, wherein the plurality of SMA actuator assemblies includes at least one of at least 2 SMA actuator assemblies, at least 5 SMA actuator assemblies, at least 10 SMA actuator assemblies, at least 20 SMA actuator assemblies, at least 50 SMA actuator assemblies, and at most 100 SMA actuator assemblies.

A66. The thermal management system of any of paragraphs A64-A65, wherein the SMA actuator assembly is a first SMA actuator assembly, wherein the SMA element is a first SMA element, and wherein the thermal management system further includes a second SMA actuator assembly with a second SMA element.

A67. The thermal management system of paragraph A66, wherein the thermal management system is configured to change the temperature of the process fluid within the heat exchange region prior to the process fluid flowing through the second SMA element.

A68. The thermal management system of any of paragraphs A66-A67, wherein the thermal management system is configured to change the temperature of the process fluid within the heat exchange region while the process fluid flows through the second SMA element.

A69. The thermal management system of any of paragraphs A66-A68, wherein the thermal management system is configured to change the temperature of the process fluid within the heat exchange region subsequent to the process fluid flowing through the second SMA element.

A70. The thermal management system of any of paragraphs A1-A69, wherein the SMA element is configured to transition from a martensite state to an austenite state responsive to the temperature of the SMA element increasing, and wherein the SMA element is configured to transition from the austenite state to the martensite state responsive to the temperature of the SMA element decreasing.

A71. The thermal management system of paragraph A70, wherein the SMA element is in the first conformation when the SMA element is in the martensite state, and wherein the SMA element is in the second conformation when the SMA element is in the austenite state.

A72. The thermal management system of any of paragraphs A70-A71, wherein the SMA element is configured to begin a transition from the martensite state to the austenite state when the SMA element reaches an initial heating temperature from below; wherein the SMA element is configured to complete the transition from the martensite state to the austenite state when the SMA element reaches a final heating temperature that is greater than the initial heating temperature; wherein the SMA element is configured to begin a transition from the austenite state to the martensite state when the SMA element reaches an initial cooling temperature from above; and wherein the SMA element is configured to complete the transition from the austenite state to the martensite state when the SMA element reaches a final cooling temperature that is less than the initial cooling temperature.

A73. The thermal management system of paragraph A72, wherein the initial heating temperature is greater than the final cooling temperature.

A74. The thermal management system of any of paragraphs A72-A73, wherein the final heating temperature is greater than the initial cooling temperature.

A75. The thermal management system of any of paragraphs A72-A74, wherein the SMA element is configured to remain in the austenite state when the temperature of the SMA element is greater than the final heating temperature.

A76. The thermal management system of any of paragraphs A72-A75, wherein the SMA element is configured to remain in the martensite state when the temperature of the SMA element is less than the final cooling temperature.

B1. A method of passively regulating a temperature of a process fluid with a thermal management fluid, the method comprising:

conveying the process fluid in heat exchange relation with a shape memory alloy (SMA) element such that the process fluid is in thermal contact with the SMA element;

transitioning the SMA element to assume a conformation among a plurality of conformations between a first conformation and a second conformation based upon a temperature of the process fluid that is in thermal contact with the SMA element;

flowing a process fluid flow of the process fluid though a heat transfer region;

flowing a thermal management fluid flow of the thermal management fluid through the heat transfer region; and modulating the thermal management fluid flow through the heat transfer region to regulate the temperature of the process fluid flow that flows through the heat transfer region;

wherein the modulating is responsive to the transitioning.

B2. The method of paragraph B1, wherein the transitioning includes twisting the SMA element about a central axis.

B3. The method of any of paragraphs B1-B2, wherein the transitioning includes rotating an actuation element that is coupled to the SMA element about a/the central axis.

B4. The method of paragraph B3, wherein the rotating includes rotating the actuation element about the central axis in a first torque direction responsive to a temperature of the SMA element increasing.

B5. The method of any of paragraphs B3-B4, wherein the rotating includes rotating the actuation element about the central axis in a second torque direction responsive to a/the temperature of the SMA element decreasing, wherein the second torque direction is opposite a/the first torque direction.

B6. The method of any of paragraphs B3-B5, wherein the modulating includes actuating at least one of a thermal management fluid inlet valve and a thermal management fluid outlet valve with the actuation element.

B7. The method of any of paragraphs B1-B6, wherein the conveying the process fluid in heat exchange relation with the SMA element is performed at least partially concurrently with the flowing the process fluid through the heat transfer region.

B8. The method of any of paragraphs B1-B7, wherein the conveying the process fluid in heat exchange relation with the SMA element is performed prior to the flowing the process fluid through the heat transfer region.

B9. The method of any of paragraphs B1-B8, wherein the conveying the process fluid in heat exchange relation with the SMA element is performed subsequent to the flowing the process fluid through the heat transfer region.

B10. The method of any of paragraphs B1-B9, wherein the method is performed utilizing any suitable component, feature, and/or structure of any of the thermal management systems of any of paragraphs A1-A76.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein, and such inventive subject matter may find utility in apparatuses, systems, and/or methods that are not expressly disclosed herein.

The invention claimed is:

1. A thermal management system configured to regulate a temperature of a process fluid via thermal exchange between the process fluid and a thermal management fluid, the thermal management system comprising:
   a heat transfer region within which the thermal exchange between the process fluid and the thermal management fluid occurs;
   a process fluid conduit configured to convey a process fluid stream of the process fluid in heat exchange relation with the heat transfer region;
   a thermal management fluid conduit configured to convey a thermal management fluid stream of the thermal management fluid in heat exchange relation with the heat transfer region; and
   a shape memory alloy (SMA) actuator assembly configured to selectively regulate a flow rate of the thermal management fluid stream, the SMA actuator assembly including:
   (i) an SMA element in thermal contact with the process fluid stream and configured to assume a conformation among a plurality of conformations, wherein the conformation of the SMA element is based, at least in part, on a temperature of the process fluid stream; and
   an actuation element coupled to the SMA element, wherein the actuation element is configured to assume a position among a plurality of positions defined between a restrictive position, in which the actuation element restricts flow of the thermal management fluid stream within the thermal management fluid conduit, and an open position, in which the actuation element permits flow of the thermal management fluid stream within the thermal management fluid conduit, and further wherein the position of the actuation element is based, at least in part, on the conformation of the SMA element.

2. The thermal management system of claim 1, wherein:
   (i) the SMA element includes an SMA torque tube that is configured to twist about a central axis to transition among the plurality of conformations; and
   (ii) the actuation element is configured to rotate about the central axis in a first torque direction responsive to a temperature of the SMA element increasing and to rotate about the central axis in a second torque direction, which is opposite the first torque direction, responsive to the temperature of the SMA element decreasing.

3. The thermal management system of claim 1, wherein the process fluid conduit is configured such that the process fluid flows through the SMA element.

4. The thermal management system of claim 3, wherein the thermal management system is configured to change the temperature of the process fluid subsequent to the process fluid flowing through the SMA element.

5. The thermal management system of claim 3, wherein the thermal management system is configured to change the temperature of the process fluid while the process fluid flows through the SMA element.

6. The thermal management system of claim 3, wherein the thermal management system is configured to change the temperature of the process fluid prior to the process fluid flowing through the SMA element.

7. The thermal management system of claim 1, wherein the SMA actuator assembly defines at least one of:
   (i) a thermal management fluid inlet valve configured to selectively permit the thermal management fluid stream to enter the heat transfer region; and (ii) a thermal management fluid outlet valve configured to selectively permit the thermal management fluid stream to exit the heat transfer region; and wherein the actuation element is configured to selectively actuate the at least one of the thermal management fluid inlet valve and the thermal management fluid outlet valve.

8. The thermal management system of claim 7, wherein the actuation element is configured to selectively actuate the at least one of the thermal management fluid inlet valve and the thermal management fluid outlet valve between a fully closed configuration and a fully open configuration, and wherein the actuation element further is configured to selectively actuate the at least one of the thermal management fluid inlet valve and the thermal management fluid outlet valve to at least one partially open configuration that is between the fully closed configuration and the fully open configuration.

9. The thermal management system of claim 1, wherein the actuation element is a first actuation element configured to rotate about a central axis through a first actuation angle in a first actuation direction responsive to a temperature of the SMA element increasing, and wherein the SMA actuator assembly further includes a second actuation element configured to rotate about the central axis through a second actuation angle in a second actuation direction responsive to the temperature of the SMA element increasing.

10. The thermal management system of claim 9, wherein the first actuation angle is different than the second actuation angle.

11. The thermal management system of claim 9, wherein the SMA actuator assembly includes a thermal management fluid inlet valve configured to selectively permit the thermal management fluid stream to enter the heat transfer region and a thermal management fluid outlet valve configured to selectively permit the thermal management fluid stream to exit the heat transfer region; wherein the first actuation element is configured to actuate the thermal management fluid inlet valve; and wherein the second actuation element is configured to actuate the thermal management fluid outlet valve.

12. The thermal management system of claim 1, wherein the SMA actuator assembly further includes a process fluid tubular that defines the process fluid conduit, and wherein the process fluid tubular extends through an interior of the SMA element.

13. The thermal management system of claim 1, wherein the thermal management system further includes a complementary heat exchange core positioned within the heat transfer region; wherein the thermal management system is configured such that at least a portion of the process fluid flows through the complementary heat exchange core; and wherein the thermal management system is configured such that process fluid exiting the complementary heat exchange core is combined with process fluid exiting the SMA element.

14. The thermal management system of claim 1, wherein the thermal management system further includes a support structure, wherein the SMA element is mounted to the support structure by at least one fixed coupling configured to restrict a mounted region of the SMA element from rotating with respect to the support structure.

15. The thermal management system of claim 14, wherein the SMA element includes an upstream end and a downstream end, wherein the upstream end is mounted to the support structure by a first fixed coupling, and wherein the downstream end is mounted to the support structure by a second fixed coupling.

16. The thermal management system of claim 1, wherein the SMA actuator assembly is a first SMA actuator assembly, wherein the SMA element is a first SMA element, and wherein the thermal management system further includes at least a second SMA actuator assembly with at least a second SMA element.

17. The thermal management system of claim 16, wherein the thermal management system is configured to change the temperature of the process fluid within the heat transfer region prior to the process fluid flowing through the second SMA element.

18. The thermal management system of claim 16, wherein the thermal management system is configured to change the temperature of the process fluid within the heat transfer region while the process fluid flows through the second SMA element.

19. The thermal management system of claim 16, wherein the thermal management system is configured to change the temperature of the process fluid within the heat transfer region subsequent to the process fluid flowing through the second SMA element.

20. A method of passively regulating a temperature of a process fluid via thermal exchange between the process fluid and a thermal management fluid, the method comprising:
conveying a process fluid stream of the process fluid in heat exchange relation with a shape memory alloy (SMA) element;
transitioning, based upon a temperature of the process fluid stream, the SMA element to assume a conformation among a plurality of conformations;
flowing the process fluid stream though a heat transfer region;
flowing a thermal management fluid stream of the thermal management fluid through the heat transfer region; and
modulating a flow rate of the thermal management fluid stream through the heat transfer region to regulate the temperature of the process fluid stream, wherein the modulating is responsive to the transitioning.

21. The method of claim 20, wherein the modulating includes rotating an actuation element that is coupled to the SMA element.

22. The method of claim 21, wherein the modulating includes actuating at least one of a thermal management fluid inlet valve and a thermal management fluid outlet valve with the actuation element.

23. The method of claim 20, wherein the conveying the process fluid stream in heat exchange relation with the SMA element is performed at least partially concurrently with the flowing the process fluid stream through the heat transfer region.

24. The method of claim 20, wherein the conveying the process fluid stream in heat exchange relation with the SMA element is performed prior to the flowing the process fluid stream through the heat transfer region.

25. The method of claim 20, wherein the conveying the process fluid stream in heat exchange relation with the SMA element is performed subsequent to the flowing the process fluid stream through the heat transfer region.

* * * * *

UNITED STATES PATENT AND TRADEMARK OFFICE
CERTIFICATE OF CORRECTION

PATENT NO. : 10,612,867 B2
APPLICATION NO. : 15/901779
DATED : April 7, 2020
INVENTOR(S) : David W. Foutch and Frederick Theodore Calkins Page 1 of 1

It is certified that error appears in the above-identified patent and that said Letters Patent is hereby corrected as shown below:

In the Claims

Claim 1, Column 22, Line 25, add --(ii)-- at the beginning of the line before "an actuation element...".

Signed and Sealed this
Eighteenth Day of August, 2020

Andrei Iancu
*Director of the United States Patent and Trademark Office*